(12) United States Patent
Meng-Suen

(10) Patent No.: US 6,481,853 B2
(45) Date of Patent: Nov. 19, 2002

(54) IMAGE PROJECTOR FORMING ROTATING IMAGE

(75) Inventor: Huang Meng-Suen, Kowloon (HK)

(73) Assignee: Mr. Christmas, Inc., New York, NY (US)

(*) Notice: Subject to any disclaimer, the term of this patent is extended or adjusted under 35 U.S.C. 154(b) by 15 days.

(21) Appl. No.: 09/732,886

(22) Filed: Dec. 11, 2000

(65) Prior Publication Data
US 2002/0071100 A1 Jun. 13, 2002

(51) Int. Cl.[7] .............................................. G03B 21/26
(52) U.S. Cl. ...................................................... 353/35
(58) Field of Search ............................. 353/28, 35, 29

(56) References Cited
U.S. PATENT DOCUMENTS

| | | | | |
|---|---|---|---|---|
| 2,174,047 A | * | 9/1939 | Stainbrook | 353/35 |
| 2,959,094 A | * | 11/1960 | Kosma | 352/87 |
| 3,600,078 A | * | 8/1971 | Michniewicz | 353/112 |
| 3,807,072 A | * | 4/1974 | Luxon, Jr. | 353/20 |
| 4,548,486 A | * | 10/1985 | Mosley | 353/120 |
| 4,756,614 A | * | 7/1988 | Kato et al. | 353/110 |

* cited by examiner

Primary Examiner—Russell Adams
Assistant Examiner—D. Ben Esplin
(74) Attorney, Agent, or Firm—Fitzpatrick, Cella, Harper & Scinto

(57) ABSTRACT

An image projector including a film assembly, a motor, a light source, and a lens. The film assembly mounts a plurality of films such that the film assembly secures a first film of the plurality of films in a stationary position with respect to the film assembly and rotatably secures, with respect to the film assembly, a second film. The motor rotates the second film. The light source projects light through the plurality of films. The lens focuses the light projected through the plurality of films. The light projected through the plurality of films and the lens forms an image having a stationary portion and a rotating portion.

16 Claims, 7 Drawing Sheets

IMAGE PROJECTOR FORMING ROTATING IMAGE

FIELD OF THE INVENTION

The present invention relates to image projectors. More particularly, the present invention relates to image projectors for projecting images from slides mounted therein.

BACKGROUND OF THE INVENTION

There are available on the market image projectors for projecting commercially prepared images on a building, home or other structure. Typically, such projectors are used to project images with messages such as "Happy Thanksgiving" or "Merry Christmas" and complimentary designs. The images are usually projected using any one of numerous commercially available films (i.e., slides or other such transparencies), which are placed in the projector by a user and can be replaced as necessary to project different images (i.e., for different holidays or seasons).

Such commercially available projectors typically include a housing containing a lamp, a film holder (which mounts a single slide/transparency), and a lens. These elements are arranged inside the housing such that the lamp projects light through the film and lens, and then out of the housing to be projected on a target surface. Typically, the lens and film holder are arranged such that a user may adjust the distance along the light path between the film and lens. This allows a user to focus the projected image.

Most commonly, these projectors are mounted on a ground stake placed in a user's yard. The side of the housing is pivotally attached to a post that is secured to the ground stake so as to provide an axis of rotation parallel with the ground. Thus, when the post is secured to the ground stake, the housing may be pivoted to change the elevation of the projected image on the home or other structure.

However, the known projectors described above have drawbacks. For example, by mounting a single slide in a conventional projector, only a stationary image is projected. Therefore, only the color and design may be used to draw attention to the projected image.

The present invention is directed to an improved image projector that simultaneously mounts a plurality of films/slides, with at least one of the films being movable during projection. Accordingly, an image having moving and stationary portions is projected, which draws more attention to the image.

SUMMARY OF THE INVENTION

It is an object of the present invention to provide an image projector that projects an image having a stationary portion and a moving portion.

It is also an object of the present invention to provide an image projector including an assembly for mounting a plurality of slides/films used to create a single projected image, such that at least one of the mounted slides/films is rotated with respect to at least one other slide/film.

According to a first aspect of the present invention, an image projector includes a film assembly mounting a plurality of films, wherein the film assembly secures a first film of the plurality of films in a stationary position, with respect to the film assembly, and rotatably secures, with respect to the film assembly, a second film of the plurality of films. A motor rotates the second film. A light source projects light through the plurality of films, and a lens focuses the light projected through the films. Accordingly, light projected through the plurality of films forms an image having a stationary portion and a rotating portion.

According to another aspect of the present invention, an image projector includes first and second assemblies, a motor, a light source, and a lens. The first assembly mounts a slide thereon. The second assembly mounts a second slide thereon. The motor rotates the second assembly. The light source projects light through the first and second slides. The lens focuses the light projected through the first and second slides. The first and second assemblies are arranged in the image projector such that the first and second films overlap when viewed along a path of the projected light.

The above features of the image projector of the present invention may be configured in any number of ways while keeping within the intended scope of the invention.

DETAILED DESCRIPTION OF THE INVENTION

Figure 3:
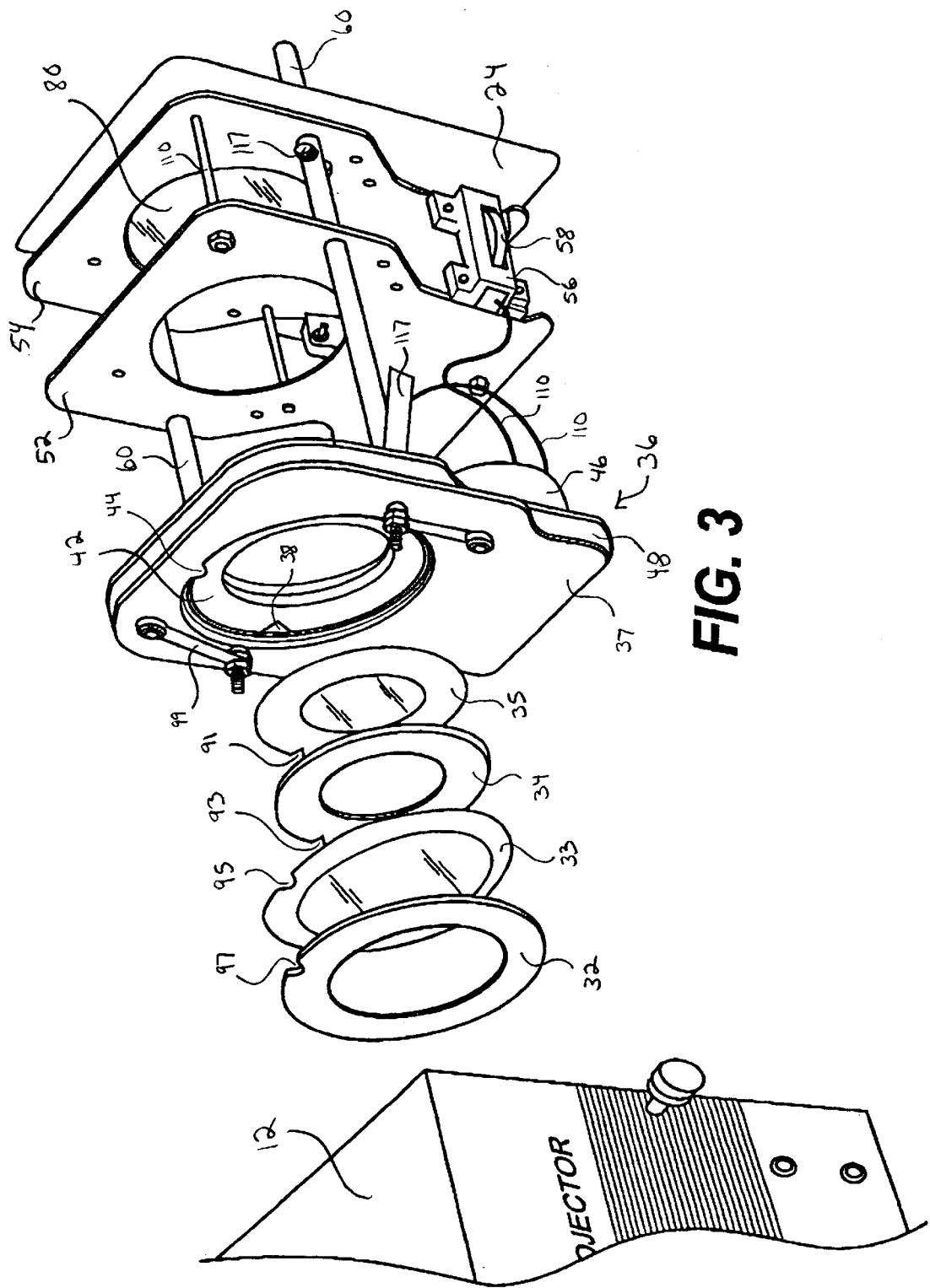
FIG. 3 is a perspective view of a portion of the internal mechanisms of one embodiment of the present invention including the film assembly.
Figure 9:
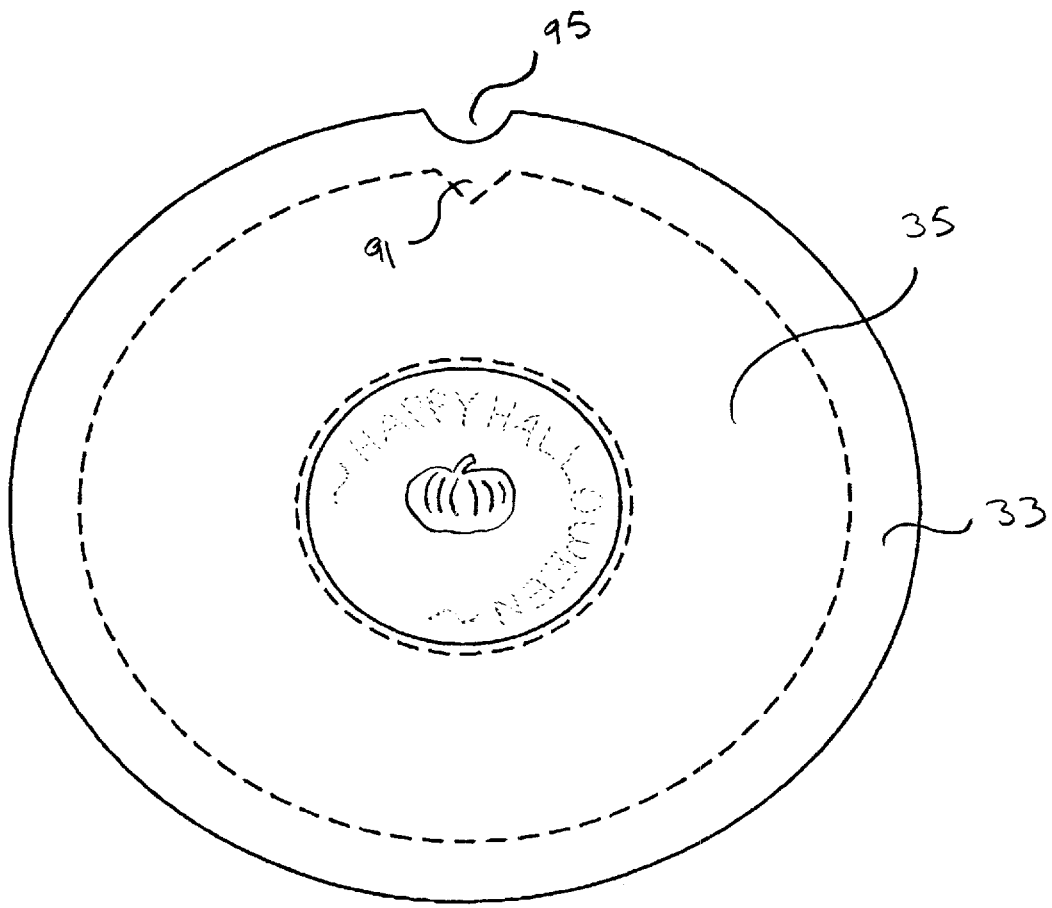
FIG. 9 is an elevational view of a moving film and a stationary film overlapping each other.

In general, the present invention is directed to an image projector 10 that projects an image which includes a moving portion and a stationary portion. This is accomplished by mounting in the image projector 10 separate films/slides having images formed thereon (for example, a rotating film 35 and a stationary film 33, as shown in FIGS. 3 and 9). While light is projected through the films to create the target image, one of the films is kept stationary to define the stationary portion of the image and the other is put in motion to define the moving portion of the image.

The features of the image projector used to accomplish the present invention, as set forth above, may be configured in any number of ways. The following description sets forth preferred arrangements and configurations for the elements of the image projector 10, such as a light source 78 for projecting light, a film assembly 36 for holding films while light is projected therethrough, a motor 46 for moving at least one of the films, and a lens 80 for focusing the target images, as well as preferred arrangements for films used in the image projector 10. Of course, other designs or arrangements may be used to accomplish the present invention and the following suggestions should not be viewed as limiting.

Figure 1:
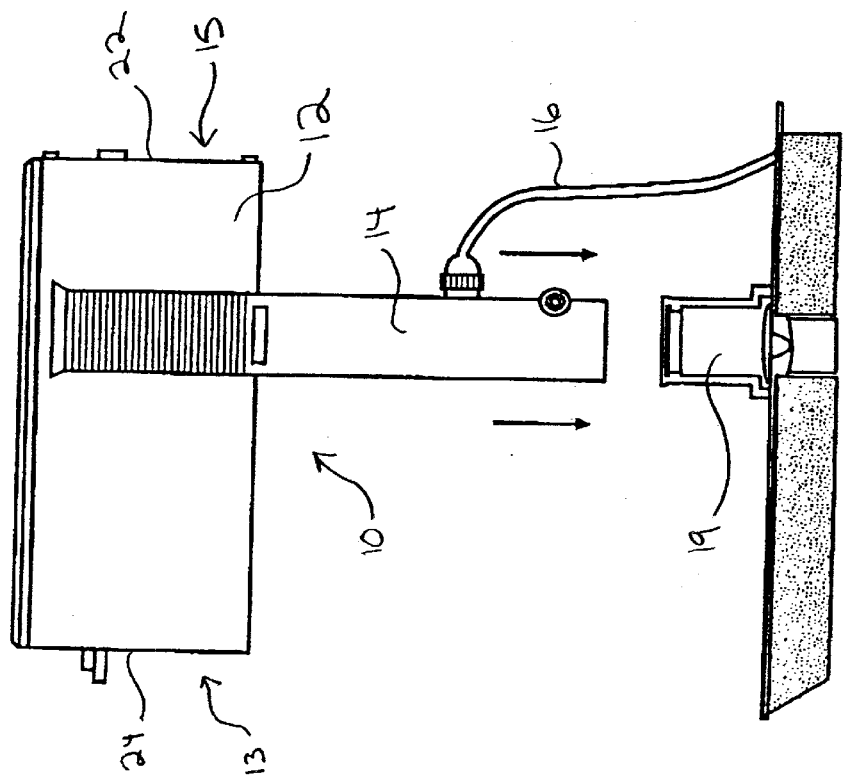
FIG. 1 is an elevational view of one embodiment of the present invention.
Figure 2:
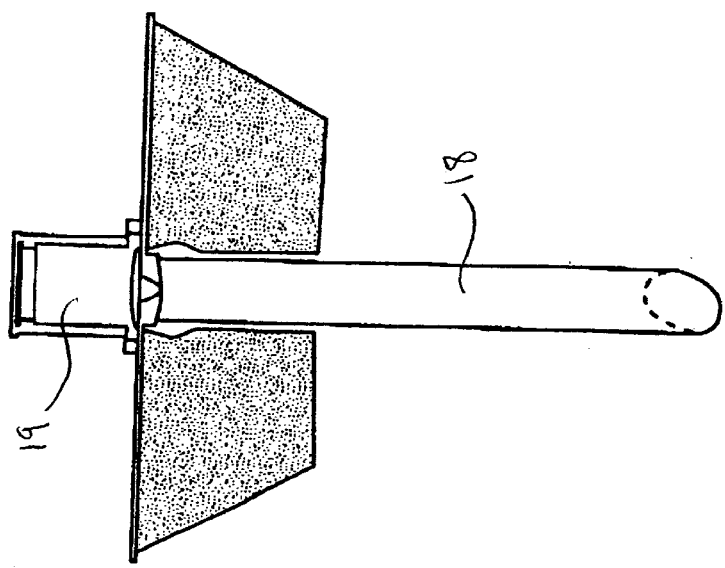
FIG. 2 is an elevational view of a ground stake for use with one embodiment of the present invention.

As shown in FIG. 1, the image projector 10 includes a housing 12 having a front opening 13 and a back opening 15. An arm 14 is pivotally attached to one side of the housing 12. The arm 14 is detachably secured to, and supported by, a ground stake 18. Accordingly, the housing 12 may be pivoted on the arm 14 (with the axis of rotation of the pivot point being substantially parallel with the ground) to alter the angle of projection of the image. However, the use of the housing 12 is not necessary to accomplish the present invention, but is only preferred for arranging and holding the elements of the invention. In addition, the housing 12 does not have to be mounted on the arm 14, which does not have to be mounted on the ground stake 18. The image projector 10 may be free standing or mounted on another base so as to be properly positioned during projection.

In the embodiment shown in FIG. 1, the arm 14 has a square opening at a free end thereof in which a head 19 of the ground stake 18 is wedged. An opposite end of the arm 14 is attached to the housing 12 by a joint (not shown) to form the pivot point. A power cord 16 extends from the arm 14. (Although not shown, the power cord 16 extends up through a hollow portion of the arm 14 and enters the housing 12 through a passage in the joint between the arm 14 and the housing 12.) The power cord 16 is not necessary in all forms of the invention. For example, the image projector 10 may be battery operated.

A front wall 24 and a back wall 22 are removably secured in the openings 13 and 15, respectively, of the housing 12 by any suitable means such as thumb screws. In addition, the front wall 24 and the back wall 22 are parallel with each other when secured to the housing 12. However, the front wall 24 and the back wall 22 are removable in the present embodiment so as to provide access to the light source 78 and the film assembly 36 as will be described below. The housing 12 may have alternative configurations as necessary to provide for simple operation and maintenance.

As discussed above, the image projector 10 of the present invention includes the light source 78. The light source 78 may be of any number of conventional designs and may be configured in the image projector in any number of ways.

Figure 5:
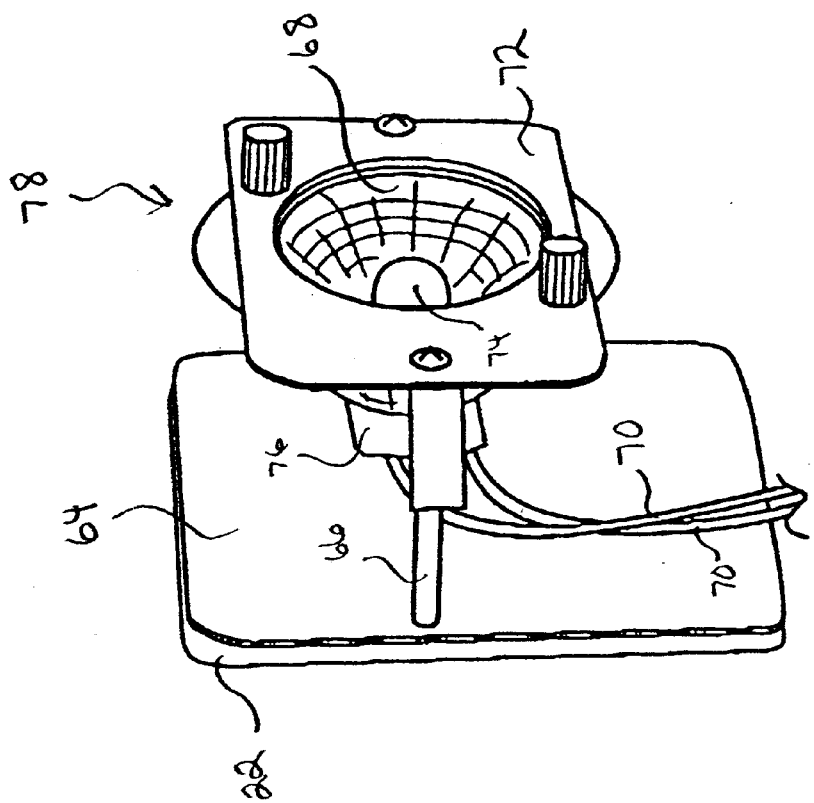
FIG. 5 is a perspective view of a portion of the internal mechanisms of one embodiment of the present invention including the light source.
Figure 6:
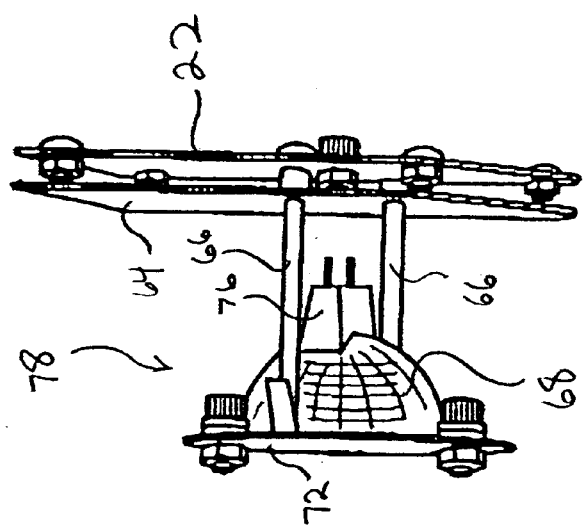
FIG. 6 is a perspective view of the mechanisms shown in FIG. 5.

In the depicted embodiment, as shown in FIGS. 5 and 6, the back wall 22 supports the light source 78 of the present invention. Thus, a user can remove the back wall 22 of the housing 12 and easily access the light source 78. Specifically, two posts 66 are secured to the back wall 22 such that they extend perpendicularly from the back wall 22 into the housing 12 when the back wall 22 is secured to the housing 12. A plate 72 is secured to opposite ends of the posts 66 that project from the back wall 22 such that it is substantially parallel with the back wall 22. The plate 72 includes a circular opening therethrough that is also substantially parallel with the back wall 22. Plate 72 mounts the light source 78 of the present invention say, for example, thumb screws 79.

As part of the light source 78, a semi-spherical reflector 68 is secured to the plate 72 on a surface thereof facing the back wall 22. The concave reflecting surface of the semi-spherical reflector 68 faces the opening in plate 72. In addition, a bulb 74 is positioned in the concavity of the semi-spherical reflector 68. The base of the bulb 74 is positioned in the base of the semi-spherical reflector 68 such that it is electrically connected to a socket 76, which is secured to the convex portion of the semi-spherical reflector 68.

Wires 70 extend from the socket 76 through the power cord 16 so as to provide an electrical connection between the bulb 74 and a power source when the power cord 16 is connected to the power source.

Typically, a fifty watt or smaller bulb provides the necessary light for projecting the image. However, the wattage and bulb type (i.e., fluorescent, halogen, etc.) may be chosen for particular applications.

In addition, other conventional means of creating and projecting light may be used for the light source 78. In particular, the configuration and shape of the semi-spherical reflector 68 may be varied or removed from the invention. Also, the light source 78 may be mounted in the projector system in any number of other ways.

The back wall 22 is secured to the housing 12 by thumb screws (not shown) that thread in through a side of the housing 12. A securing plate 64, shown in FIG. 6, is situated between the back wall 22 and the plate 72, and is secured to the posts 66. Consequently, the securing plate 64 is positioned within the housing 12 when the back wall 22 is mounted thereon. When fully assembled, the thumb screws are secured in the side of housing 12 such that the tips of the thumb screws are positioned between the back wall 22 and the securing plate 64 in the direction of the lengths of posts 66. Accordingly, the thumb screws restrict the movement of the back wall 22 and the securing plate 64 to secure the back wall 22 in the opening 15. Alternatively, the back wall 22 may be connected to the housing 12 by other configurations. Also, the light source 78 may be accessed by structures other than the removable back wall 22.

Figure 4:
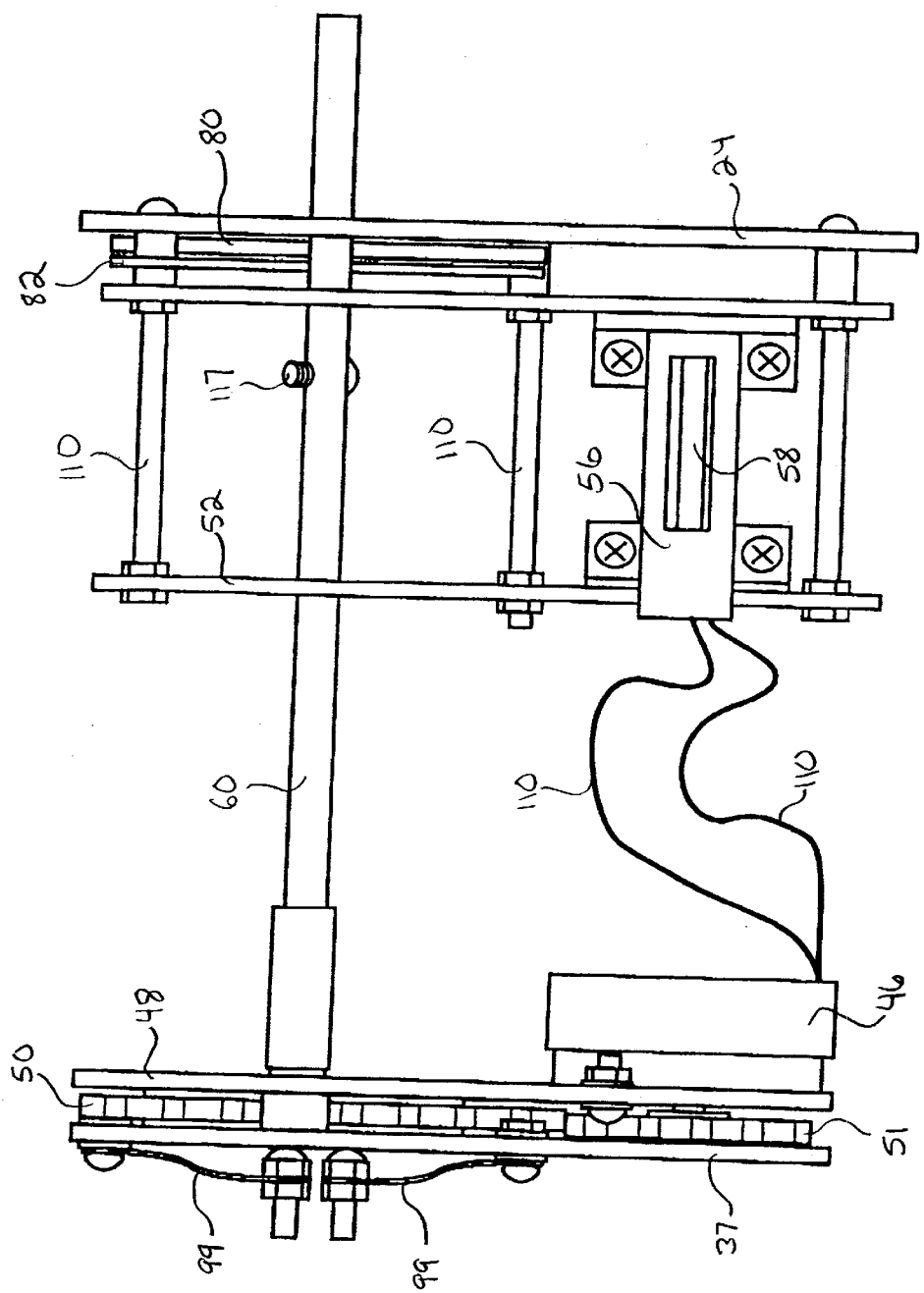
FIG. 4 is a side view of the mechanisms shown in FIG. 3.

Also in this embodiment, as shown in FIGS. 3 and 4, the front wall 24 supports and secures the film assembly 36 and the lens 80 of the present invention.

The front wall 24 has a circular opening extending therethrough (not shown), exposing the inside of the housing 12 when mounted. A securing ring 82, shown in FIG. 4, is secured to a surface of the front wall 24 facing the inside of the housing 12. The lens 80 is clamped between the front wall 24 and the securing ring 82 such that the lens 80 is exposed in the openings through the securing ring 82 and the front wall 24. Thus assembled, light exiting the housing 12 through the hole in the front wall 24 passes though the lens 80. Accordingly, the lens 80 is used to focus the target image.

However, any number of configurations may be used to mount the lens 80 in the image projector 10. In particular, the lens 80 may be arranged so as to be movable along the light path of the image projector 10 to focus the image. Alternatively, the image projector 10 may be configured such that the films 33 and 35 are movable with respect to the lens 80. Such arrangements are discussed in more detail below.

Conventional lenses of a wide variety of designs and powers may be used depending on the particular projector.

Guide plates 52 and 54 are secured to the front wall 24 and the securing ring 82 by screws 110 at different distances, and are positioned within the housing 12 when the front wall 24 is mounted on the housing 12. When mounted, the front wall 24 is secured to the housing 12 by a thumb screws 115. The thumb screws 115 are screwed into the side of the housing 12 such that the tip of the screw 115 is positioned between the front wall 24 and the guide plate 54. Similarly to the thumb screws used to secure the back wall 22, the thumb screws 115 restrict the movement of the combined structures of the front wall 24 and the guide plate 54 in a direction parallel to the light path. However, other configurations may be used to secure the front wall 24 to the housing 12. Alternatively, the workings of the image projector 10 may be accessed by structures other than the removable front wall 24.

The guide plates 52 and 54 are secured such that they are parallel with the front wall 24. As shown in FIG. 3, the guide plates 52 and 54 have openings therethrough parallel and aligned with the openings through the front wall 24 and the securing ring 82.

The guide plates 52 and 54 provide a system for securing the back wall 22. The guide plates 52 and 54 also provide guidance and support for posts 60, which are discussed below. However, the guide plates 52 and 54 are not necessary in all embodiments of the present invention, and the design of the image projector may be varied to include structures other that the guide plates 52 and 54.

The posts 60 extend through the guide plates 52 and 54 and the front wall 22 at positions outside of the aligned openings therethrough (discussed above) as viewed in a direction of the light path. Also, the posts 60 are positioned through the front wall 24 and the guide plates 52 and 54 such that the posts 60 are perpendicular to the guide plates 52 and 54 and the front wall 24, that is, the posts 60 extend in the direction of the light path. Thus assembled, the posts 60 slidingly engage the guide plates 52 and 54 and the front wall 24 such that the posts 60 slide through the plates 52 and 54 and the front wall 24 along a path substantially parallel with the light path.

Free ends of the posts 60 project through the front wall 24 and are positioned outside of the housing 12. As shown in FIGS. 3 and 4, to prevent the free ends of the posts 60 from sliding completely into the housing 12 through the front wall 24, each of the posts 60 has a screw 117 secured through a cross section thereof. The screws 117 are exposed in portions of the posts 60 located between the guide plates 52 and 54. Accordingly, the screws 117 can abut the guide plates 52 and 54 when the posts 60 are slid so as to restrict the movement of the posts 60 through the guide plates 52 and 54. Thus, the posts 60 may slide along a path parallel with the light path only for a distance equal to the distance between the guide plates 52 and 54. The ends opposite the free ends of the posts 60 are secured to the film assembly 36.

Thus configured, the free ends of the posts 60 may be slid by a user to adjust the position between the film assembly 36 (including the films 33 and 35) and the lens 80. This movement in turn allows for the focusing of the projected image. Of course, other methods may be used to perform focusing, and the depicted embodiment just provides one example. For instance, the lens 80 may be movable with respect to the film assembly 36 and the housing 12.

The film assembly 36 secures a plurality of films, such as slides or other such transparencies, so that light from the light source 78 is projected through the films to create a projected image. The films are preferably disc shaped with a diameter in the range of 1.5–4.0 in. Preferably, all of the films are mounted in one film assembly 36. By such a configuration, the films are kept close to one another, which makes it simpler to focus the projected image with a simple lens system such as the lens 80. However, one or more film assemblies may be provided depending on the number of films to be used and the specific design of the image projector 10.

When a single film assembly is used, the film assembly 36 secures two or more films, such as the stationary film 33 and the rotating film 35, shown in FIGS. 4 and 9. At least one film is secured so as to be stationary with respect to the film assembly 36 and/or the image projector 10 as a whole, so that light projects therethrough to form a stationary image on the target surface, i.e., the stationary film 33 in the depicted embodiment. A second film (i.e., the rotating film 35) is put in motion with respect to the film assembly and/or projector as a whole. Preferably, the rotating film 35 is rotated such that the projected light travels along the axis of rotation. Accordingly, light from the light source 78 passes through the film to project a rotating image on the target surface.

Depending on the desired final image, the different films mounted in the film assembly 36 (or assemblies) may completely overlap, partially overlap, or merely be adjacent to each other when viewed along the path of the projected light.

Preferably, the films overlap when viewed along the light path so as to provide complimentary portions of the projected image. Preferably, just two films overlap such that the stationary film 33 forms a stationary central portion of the projected image and the rotating film 35 forms an outer boundary of the projected image that rotates about the central portion. This may be achieved by a combination of a film assembly 36 that properly secures the stationary film 35 and the rotating film 33 in an overlapping manner, and such films being designed to provide complimentary portions of the final image when mounted in the film assembly 36 in a overlapping fashion. Of course, the exact relationship between the configuration of the film assembly 36 and placement of designs on the different films may be varied as necessary.

FIG. 3 shows one such configuration for mounting films. The film assembly 36 includes a film mounting plate 37 and a motor mounting plate 48, which are parallel with the guide plates 52 and 54 and the front wall 24 when fully assembled. The motor mounting plate 48 includes a pair of biasing arms 117 (one shown) mounted on opposing sides of the motor mounting plate 48. The biasing arms 117 provide a biasing force against opposing inner walls of the housing 12 in directions substantially perpendicular to the respective walls of the housing 12. Thus, the biasing arms 117 keep the film assembly 36 firmly positioned in the housing 12.

It is preferable that the stationary film 33 and rotating film 35 be mounted separately in the film assembly 36. The structures used to mount the films may be of any number of configurations.

Preferably, the stationary film 33 and rotating film 35 are secured at portions peripheral to their designs on separate plates having openings therethrough to allow light to pass through the films. Most preferably, the films are mounted on ring-shaped depressions or ledges (having openings therethrough defining the inner boundary of the ring) on the plates.

Figure 8:
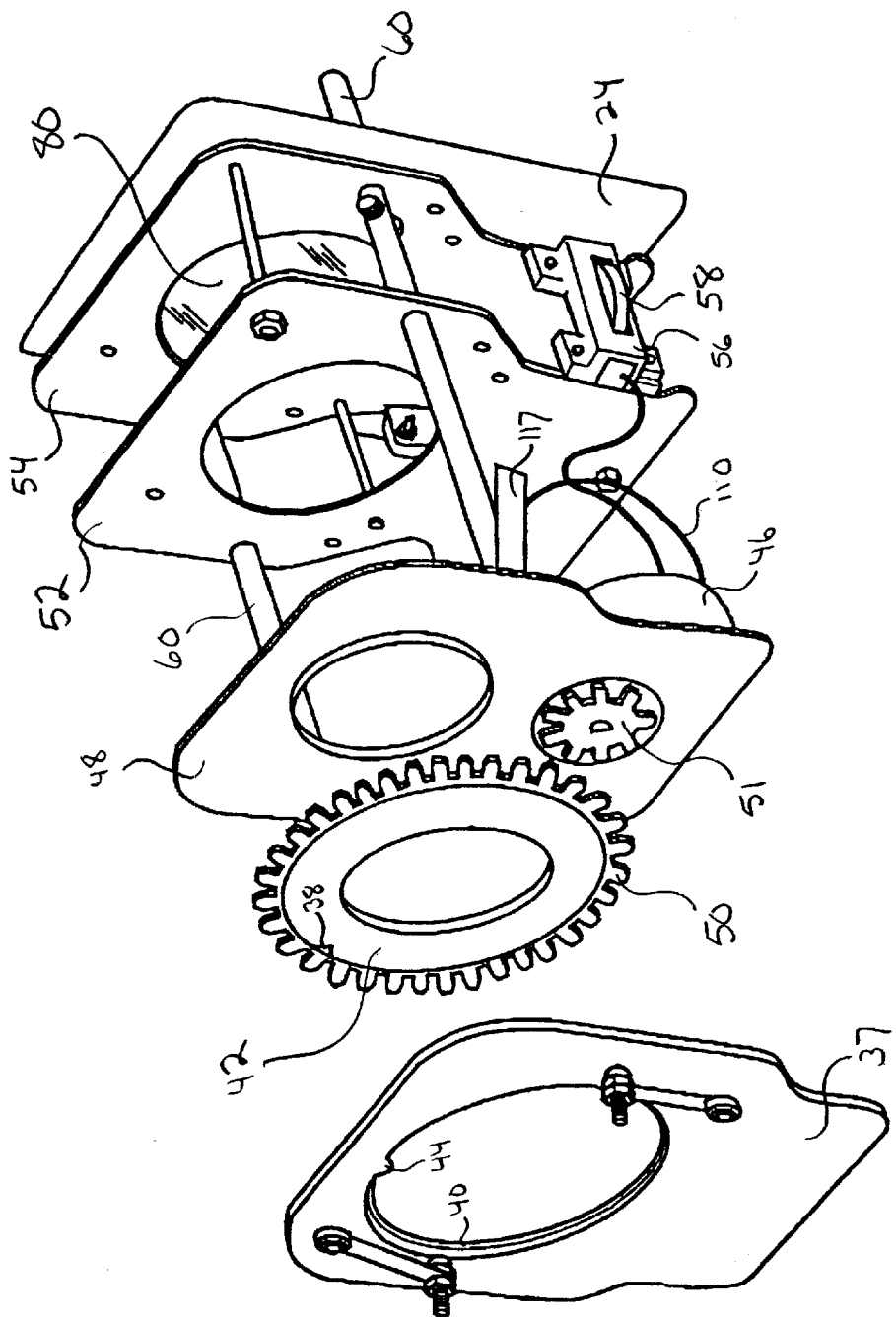
FIG. 8 is an exploded view of structures shown in FIG. 3.

As shown in FIG. 8, the film mounting plate 37 includes a ring-shaped depression 40 in a face thereof substantially parallel with the guide plates 52 and 54 and opposite the motor mounting plate 48. The ring-shaped depression 40 has a circular opening extending therethrough along the light path, which defines the inner boundary of the ring shape. The surface of the ring-shaped depression 40 is also parallel with the film mounting plate 37, the guide plates 52 and 54, and the front wall 24.

Rotatably secured in the opening through the ring-shaped depression 40 is a rotating ring 42 which has a circular opening therethrough extending along the light path and defining the inner boundary of the ring. The surface of the rotating ring 42 facing in the same direction as the ring-shaped depression 40 is parallel with the ring-shaped depression 40. However, that surface of the rotating ring 42 is offset from the ring-shaped depression 40 so as to be closer to the front wall 24. In addition, the rotating ring 42 is concentric with the ring-shaped depression 40. Accordingly, when viewed in the direction of light projection, the film mounting plate 37 includes two concentric ring-shaped steps or ledges descending in a direction from the face of film the mounting plate 37 toward the front wall 24. The first step is defined by the ring-shape depression 40 and the second step is defined by the surface of the rotating ring 42.

The diameters of the ring-shaped steps, respectively defined by ring-shape depression 40 and rotating ring 42, correspond to the diameters of the films to be mounted in the film assembly 36.

Specifically, as shown in FIG. 3, the rotating film 35, which is disc shaped and has a design formed on a relatively transparent portion thereof, fits in the depression defined by the rotating ring 42 such that outer portions of the film lie flush against the rotating ring 42 and a center portion is exposed through the opening in the rotating ring 42. Formed along the outer circumference of the face of the rotating ring 42 defining the step or ledge is a lip 43. The lip 43 restricts the movement of the edges of the rotating film 35 in directions parallel with the face of the rotating ring 42.

In addition, a triangular projection 38 is provided on the surface of the rotating ring 42. The triangular projection 38 engages a triangular notch 91 in the rotating film 35. The engagement of the triangular projection 38 and the triangular notch 91 restricts the movement of the rotating film 35, with respect to the rotating ring 42, in the direction of rotation.

Also, a rotating retention ring 34 having similar cross-sectional dimensions to the rotating film 35 (as viewed along the light path) is placed against the rotating film 35 when mounted on the rotating ring 42, such that an opening through the rotating retention ring 34 (which defines an inner boundary of the ring shape) is substantially aligned with the opening through rotating the ring 42 along the light path. The design on the rotating film 35 is exposed through those aligned openings.

The rotating retention ring 34 also includes a triangular notch 93, in an outer edge thereof, that engages the triangular projection 38 in a manner similar to the triangular notch 91 in the rotating film 35. The rotating retention ring 34 is used to clamp the rotating film 35 against the rotating ring 42.

The stationary film 33, which is also disc shaped and has a design formed on a relatively transparent portion thereof, fits in the ring-shaped depression 40 in the film mounting plate 37 such that outer portions of the stationary film 33 (i.e., outer portions of a face of the disc shape) lie flush against the ring-shaped depression 40. Thus mounted in the ring-shaped depression 40, the movement of the stationary film 33 is restricted in directions perpendicular to the film mounting plate 37 by the outer boundaries defining the ring-shaped depression 40.

A semi-circular projection 44 is provided in the ring-shaped depression 40. The semi-circular projection 44 engages a semi-circular notch 95 in the stationary film 33. The engagement of the semi-circular projection 44 and the semi-circular notch 95 restricts the movement of the stationary film 33, with respect to the film mounting plate 37, in the direction of rotation of the rotating ring 42. Thus, the stationary film 33 may be kept stationary with respect to the image projector 10 when mounted.

Also, a stationary retention ring 32 having similar cross-sectional dimensions to the stationary film 33 (as viewed along the light path) is placed against the stationary film 33 when mounted in the ring-shaped depression 40, such that an opening through the stationary retention ring 32 (which defines an inner boundary of the ring shape) is substantially aligned with the opening through the film mounting plate 37 (which defines an inner boundary of the ring-shaped depression 40) in the light pa th. Thus, the design on the stationary film 33 is exposed through the aligned openings in the ring-shaped depression 40 and the stationary retention ring 32.

The stationary retention ring 32 also includes a semi-circular notch 97 in an outer edge thereof that engages the semi-circular projection 44 in a manner similar to the semi-circular notch 95 in the stationary film 33. The stationary retention ring 32 is used to clamp the stationary film 33 against the ring-shaped depression 40.

As shown in FIGS. 3 and 4, bias members 99 are secured to the film mounting plate 37 at opposing sides of the ring-shaped depression 40. when the films 33 and 35 and the retention rings 32 and 34 are placed in their respective positions, free ends of the biasing members 99 are rotatable about an axis substantially perpendicular with the surface of the ring-shaped depression 40 so that free ends thereof come into contact with and provide a biasing force against the stationary retention ring 32 to press each of the rotating film 35 and the stationary film 33 against the rotating ring 42 and the ring-shaped depression 40, respectively.

Of course, other configurations may be used to mount and secure the films 33 and 25 in image projector 10 so as to project light therethrough. The ring-shaped members and disc-shaped films are only one system for implementing the present invention.

Preferably, the moving film (i.e., the rotating film 35) is put in motion by rotating the structure on which that film is mounted (i.e., the rotating ring 42 shown in FIG. 3 and 8). Most preferably, the mounting structure rotates in a direction substantially perpendicular to the direction of the projected light. The film may be rotated with respect to the rest of the film assembly and/or image projector as a whole.

The system for moving or rotating films may be any one of a number of conventional designs. Accordingly, the design specifics regarding mounting and rotating the films may be modified while still keeping with the spirit and intended scope of the invention. Preferably, to provide the moving portion of the projected image, the rotating ring 42 is rotated about an axis substantially perpendicular to the faces of the rotating ring 44 and the ring-shaped depression 40, and parallel with the light path. The rotational force is provided by the motor 46. The rotational moving force may be transferred by any number of known designs.

In the depicted embodiment, as shown in FIGS. 4 and 8, outer edges of the rotating ring 42 positioned on a side of the film mounting plate 37 opposite the ring-shaped depression 40 define a toothed gear 50. The teeth of the gear 50 extend in directions substantially parallel with the face of the depression of the rotating ring 42 defined by the lip 43. In addition, the path of the teeth of the gear 50 is substantially concentric with the lip 43, and the depression in the rotating ring 42 defined thereby. The gear 50 is positioned between the film mounting plate 37 and the motor mounting plate 48 such that the teeth of the gear 50 also extend in directions parallel with the film mounting plate 37.

A pinion 51 is also provided between the film mounting plate 37 and the motor mounting plate 48, as shown in FIGS. 4 and 8. As seen in FIG. 8, the teeth of the pinion 51 extend in the same directions as the teeth of the gear 50. As viewed along the light path, the teeth of the pinion 51 engage the teeth of the gear 50 to form a gear train in which the axises of rotations of the gear 50 and pinion 51 are parallel to each other. Thus, the directions of rotation of the gears 50 and 51 are co-planar.

The motor 46 is secured to a face of the motor mounting plate 48 closest to the front wall 22. A shaft rotated by the motor 46 is secured to the pinion 51 to rotate the gear 50 when the motor 46 is actuated. Therefore, the pinion 51 engages the gear 50 of the rotating ring 42 to rotate the rotating ring 42 and the rotating film 35 mounted thereon.

Figure 7:
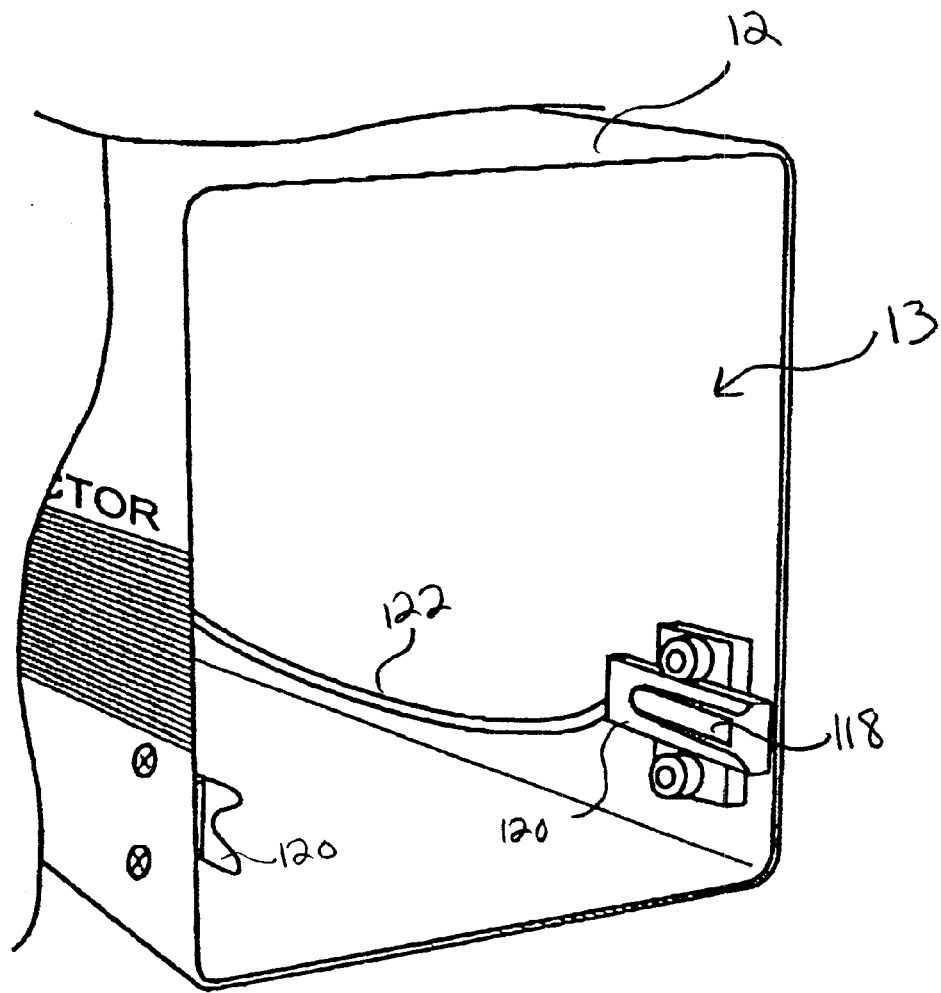
FIG. 7 is a perspective view of a housing of one embodiment of the present invention.

The motor 46 is electrically connected by wires 111 to arcuate electrical contacts 58 (one of two of which is shown in FIG. 4). The arcuate electrical contacts 58 are mounted in respective contact holders 56 (one of two of which is shown), which are each mounted on edges of both of the guide plates 52 and 54. The arcuate electrical contacts 58 bow in a direction substantially perpendicular to the light path. As shown in FIG. 7, elongated electrical contacts 118 (one of two of which is shown) are mounted in respective engaging members 120, which are secured to opposing inside walls of the housing 12. When the front wall 24 is mounted on the housing 12, the arcuate electrical contacts 58 and the contact holders 56 slidingly engage slots formed in the corresponding engaging members 120 such that the arcuate electrical contacts 58 and the elongated electrical contacts 118 form electrical connections. Wires 122 connect the elongated electrical contacts 118 to a power supply through the power cord 16. Of course, the position and workings of the motor and electrical connections therefor may be varied while keeping within the scope of the present invention.

Thus constructed, light from the bulb 74 is projected out of the semi-spherical reflector 68 toward the film assembly 36, with the semi-spherical reflector 68 being substantially aligned with the openings in the ring-shaped depression 40 and the rotating ring 42. The projected light passes through the designs on the rotating film 35 and the stationary film 33, and through the openings in the film mounting plate 37, the rotating ring 42, and the retention rings 32 and 34. The light then passes through the openings in the guide plates 52 and 54, and through the lens 80 mounted in the opening in the front wall 24.

In preferred embodiments, a light filter (not shown) may be provided between the bulb 74 and the film assembly 36, such that light from the bulb 74 is filtered before reaching the films 33 and 35. The filter may be combined with the light source 78 or positioned on its own within housing 12. When positioned on its own, the filter may be mounted on a partition within the housing 12, such that the partition only allows light passing through the filter to reach the film assembly 36. The filter may be used to reduce glare and other reflections that could affect the projected image, and preferably is polarized.

As light is projected through the films 33 and 35, the motor 46 causes the pinion 51 to rotate. In turn, the teeth of the pinion 51 engage the teeth of the gear 50 to cause gear 50, and consequently all of the rotating ring 42, to rotate. Thus, the rotating film 35 secured on rotating ring 42 rotates as light is projected therethrough.

Accordingly, once projected on a target surface, the image formed by the projected light includes a rotating portion defined by the design on the rotating film 35 and a stationary portion defined by the design on the stationary film 32.

Examples of those films are shown in FIG. 9 in an overlapping manner. The rotating film 35 has a design only on outer semi-transparent portions thereof, with the central portion of the rotating film 35 being clear. The design on the stationary film 33 is sized and shaped so that it overlaps only with the clear portion of the rotating film 35 when the two films are mounted in the film assembly.

Using the examples of films in FIG. 9, the projected image could include a stationary portion containing the pumpkin formed on the film 33, and a rotating portion including the phrase "Happy Halloween," on rotating film 35, which rotates around the pumpkin. Of course, the layouts of the films may be varied to achieve a wide variety of combinations of stationary and moving portions of the projected image.

The image may be focused by sliding the posts 60 in and out of the housing 12 to vary the distance between the film assembly 36 and the lens 80.

While the present invention has been described above with respect to what is considered to be preferred embodiments, the invention is not limited to the disclosed embodiments. To the contrary, the invention is intended to cover various modifications and equivalent arrangements included within the spirit and scope of the appended claims. The scope of the claims is to be accorded the broadest interpretation so as to encompass all such modifications and equivalent structures and functions.

I claim:

1. An image projector, comprising:
   a film assembly mounting a plurality of films, wherein said film assembly is configured to secure a first film of said plurality of films in a stationary position with respect to said film assembly, and is configured rotatably to secure, with respect to said film assembly, a second film of a plurality of films secured in said film assembly;
   a motor for rotating a second film secured in said film assembly;
   a light source projecting light through a plurality of films secured in said film assembly; and
   a lens for focusing the light projected through a plurality of films secured in said film assembly,
   wherein said motor rotates the second film secured in said film assembly while said light source projects light through the first film and the second film, and said lens forms a projected image such that the projected image includes a stationary center portion, formed by the first film, and a rotating outer boundary, formed by the second film, which rotates completely around the stationary center portion.

2. An image projector according to claim 1, wherein said film assembly comprises a first film holder for mounting the first film and a second film holder for mounting the second film, wherein said first and second film holders are arranged so as to mount the plurality of films in an overlapping fashion with respect to a direction of the projected light.

3. An image projector according to claim 2, wherein said motor rotates the second film secured in said film assembly while said light source projects light through the first film and the second film secured in said film assembly, such that the projected image includes a stationary center portion and a rotating outer boundary.

4. An image projector according to claim 2, wherein said second film holder of said film assembly comprises a rotating ring-shaped surface positioned at a first depth, in the direction of the projected light, rotated by said motor, and said second film holder comprises a stationary ring-shaped surface positioned at a second depth, wherein the first film may be mounted on said stationary ring-shaped surface and the second film may be mounted on said rotating ring-shaped surface.

5. An image projector according to claim 4, wherein said film assembly further comprises a biasing member providing biasing force substantially in a direction of the projected light; and wherein said biasing member is configured to press the first film against said stationary ring-shaped surface so as to be held stationary, and the second film against said rotating ring-shaped surface to cause the second film to rotate with said second film holder.

6. An image projector according to claim 4, wherein said rotating ring-shaped surface comprises a projection for engaging the second film to cause the second film to rotate at the same rate as said second film holder.

7. An image projector according to claim 6, wherein said stationary ring-shaped surface comprises a projection for engaging the first film to prevent the first film from rotating.

8. An image projector according to claim 2, wherein said film assembly and said lens are slidingly secured to each other such that a distance along the light path between said lens and the plurality of films mounted in said film assembly is variable; and wherein focusing of the projected image is performed by varying the distance between said lens and the plurality of films in said film assembly.

9. An image projector according to claim 8, further comprising a housing containing said film assembly, said lens, and said light source, wherein said light source and said lens are configured to be secured in said housing; and further comprising means for varying the position of said film assembly with respect to said lens and said housing.

10. An image projector according to claim 9, wherein said motor is mounted on said film assembly.

11. An image projector comprising:

mounting means for mounting a plurality of slides, wherein said mounting means is configured to secure a first slide of the plurality of slides in a stationary position with respect to said mounting means, and to rotatably secure, with respect to said mounting means, a second slide of the plurality of slides;

rotating means for rotating a second slide secured in said mounting means;

light projecting means for projecting light through the plurality of slides secured in said mounting means; and focusing means for focusing the light projected through the plurality of slides secured in said mounting means, wherein the light projected through the first slide and the rotating second slide forms a projected image including a stationary center portion, formed by the first slide, and a rotating outer boundary, formed by the second slide, which rotates completely around the stationary center portion.

12. An image projector, comprising:

a first assembly on which a first slide may be mounted;

a second assembly on which a second slide may be mounted;

a motor for rotating said second assembly;

a light source projecting light through first and second slides mounted respectfully on said first assembly and said second assembly and then from said image projector; and a lens for focusing the light projected through first and second slides mounted respectfully on said first assembly and said second assembly, wherein the light projected through the first slide and the rotating second slide forms a projected image including a stationary center portion, formed by the first slide, and a rotating outer boundary, formed by the second slide, which rotates completely around the stationary center portion.

13. The image projector according to claim 12, wherein said first and second assemblies are arranged in said image projector along a path of the light projected from said light source such that first and second films mounted in said first and second assembly overlap when viewed along the path of the light.

14. The image projector according to claim 12, wherein said second assembly is formed in the shape of a gear, and said motor rotates a pinion that engages said gear, with teeth of the pinion engaging teeth of the gear to form a gear train, to rotate said gear while the light is projected through a first slide mounted therein.

15. The image projector according to claim 12, wherein said first assembly comprises a first depression with an opening therethrough configured to couple the first slide to mount the first slide on said first assembly, and said second assembly comprises a second depression with an opening therethrough configured to couple the second slide to mount the second slide on said second assembly.

16. The image projector according to claim 15, wherein said first and second depressions are ring shaped and concentric.

* * * * *